Aug. 29, 1950      K. K. SHEPARD      2,520,473
SPRING PRESSED CENTER PIN FOR LATHES
Filed Jan. 6, 1945
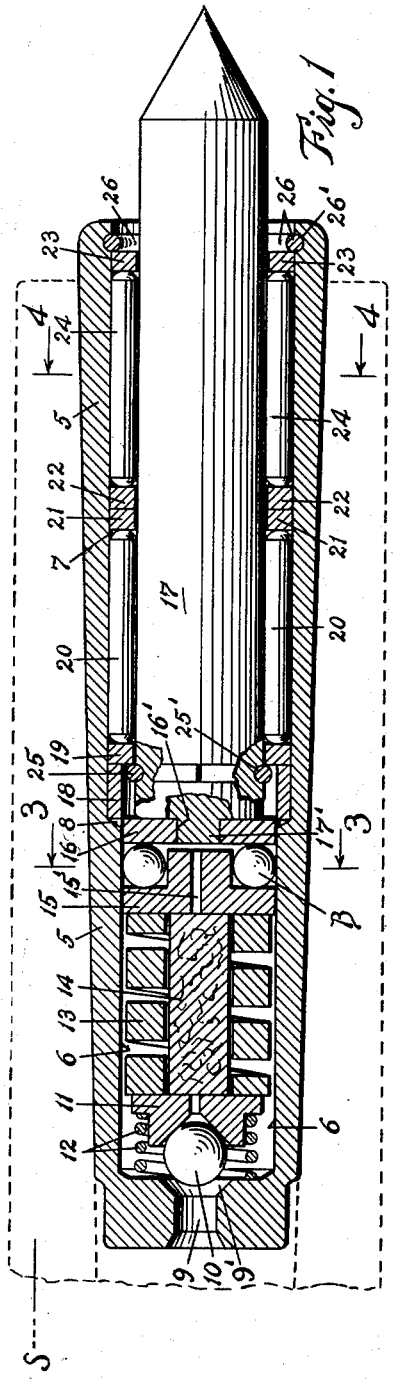
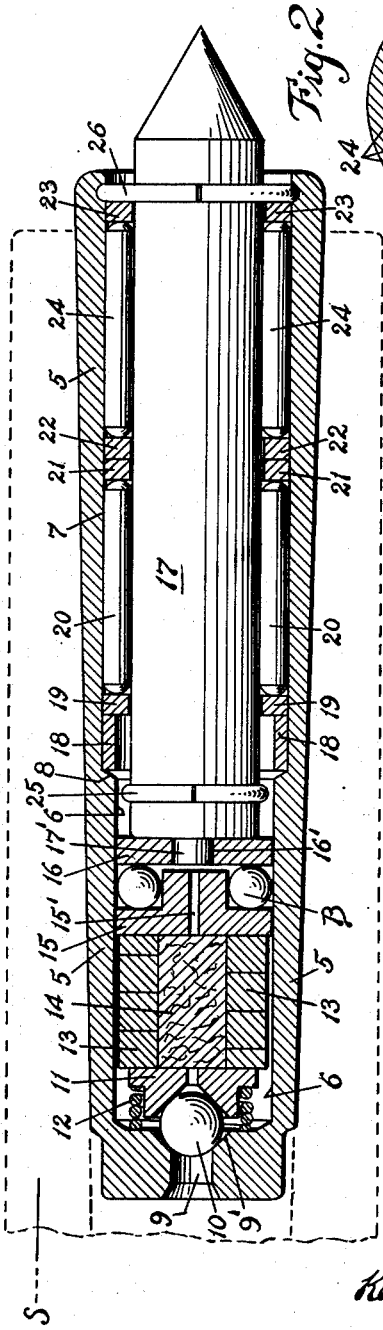
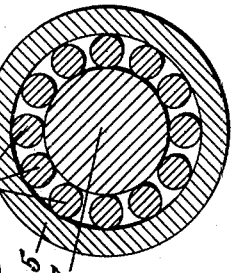
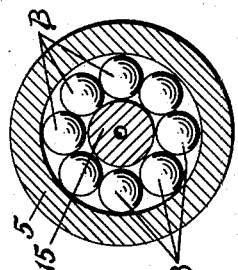
Inventor
Kelvin K. Shepard
By R. S. Berry
Attorney Patented Aug. 29, 1950

2,520,473

UNITED STATES PATENT OFFICE 2,520,473

SPRING PRESSED CENTER PIN FOR LATHES

Kelvin K. Shepard, Los Angeles, Calif., assignor, by direct and mesne assignments, to William A. Howard, San Gabriel, Calif.

Application January 6, 1945, Serial No. 571,689

8 Claims. (Cl. 82—33)

This invention relates to spring pressed center pins for lathes, and has among its salient objects: to provide a spring-pressed center pin for lathes which is accurately centered and held for rotation and also for axial or longitudinal movement wholly within a tapered casing adapted to be connected with the head stock or tail stock of a lathe; to provide in such a mechanism antifriction thrust means whereby there is a firmness and rigidity and at the same time sufficient yieldableness under pressure to give efficiency without looseness; to provide therein lubricating means with valve means to be closed by the initial movement inwardly of said center pin, whereby to prevent the lubricant from working to the outside of said casing; to provide in combination with spring means wick-like means for absorbing and holding lubricant, and which is compressible with the spring, and is expansible therewith, whereby the lubricant is most effectively distributed to the working parts within said casing; to provide a mechanism of the character referred to in which the center pin is not only yieldably adjustable under heat conditions sufficient to cause expansion of parts, but in which the center pin is held to true center, though there may be certain wear around the outer portions of the working parts of the mechanism within said casing; and, in general, to provide a practical and efficient center pin holding mechanism which is easily assembled and economical in operation.

In order to explain my invention in detail, I have shown on the accompanying sheet of drawings one practical embodiment thereof, which I will now describe.

Fig. 1 is a longitudinal sectional view through a center pin mechanism embodying my invention in its normal position;

Fig. 2 is a similar view, showing the parts compressed as when under a work load; and Figs. 3 and 4 are cross sectional views taken, respectively on lines 3—3 and 4—4 of Fig. 1.

Referring now in detail to the drawings, my invention as here shown for explanatory purposes includes a casing 5 of tapering form as to its exterior, and on its inside having two cylindrical chambers designated 6 and 7, of slightly different diameters, indicated by the annular shoulder 8 therebetween.

In the small end is a bore 9, with a valve seat 9' inwardly thereof to receive a ball valve 10, with a thrust valve seat member 11 bearing against the opposite or inward side of said ball valve, and with a coiled spring 12 between said thrust valve seat member 11 and the inner end of said cylindrical chamber 6.

A heavier coiled spring 13 is next placed in said chamber 6, with a compressible, absorbent pad or member 14 within said spring 13, as shown, with a bearing thrust member 15 bearing against the end of said spring and said pad or member, as shown, said thrust member 15 having a port 15' therethrough, axially thereof.

A bearing plate or partition member 16 is movably inserted in said cylindrical chamber 6, adjacent the annular shoulder 8, Fig. 1, said member 16 having a central opening 16' therethrough to receive a central extension end 17' on the center pin 17, as indicated.

A series of ball bearings B are shown around the bearing thrust member 15, and against the movable partition member 16. These balls take the thrust from the center pin 17 on the member 18.

Within the end of the larger cylindrical chamber 7, is an insert ring member 18, having a thickness about the same as the difference between the diameters of the two cylindrical chambers 6 and 7, as shown and against which rests a bearing ring 19, for a series of bearing rollers, 20, 20, with another bearing ring 21 at the other ends of said rollers.

A second pair of bearing rings 22 and 23 are shown, with a second series of bearing rollers 24, 24, therebetween, all as clearly shown in said Figs. 1 and 2.

A split insert compression ring 25 is placed around the inner end of said center pin 17, within an annular groove formed in said center pin and designated 25'. This ring tends to hug said center pin and engages the inner face of the bearing ring 19, sufficiently to prevent said center pin from moving outwardly without moving said bearing ring with it.

In the outer end of said casing 5 is an insert expansion, retaining ring 26, seated in an annular groove 26' in the end of said casing, to prevent the assembled rollers and their bearing rings and said center pin from being removed without first removing said split expansion ring 26, as will be understood from the showing made.

Thus it will be seen that when the expansion, split retaining ring 26 in the outer end of said casing 5 has been removed, the inner compression ring 25, around the inner end of said center pin 17, and seated in the groove 25' thereof, the entire assembly of center pin 17, rollers 20 and 24, with their bearing rings 19, 21, 22 and 23, can be withdrawn from the cylindrical chamber 7.

It will also be seen that the partition member 16, and all the parts rearwardly thereof, including the ball bearings B, the coiled springs 13, 12, ball valve 10 and pad 14 can be pushed out through the insert ring 18, near the shoulder 8, between the two cylindrical chambers 6 and 7.

The invention as here shown is inserted in the usual stock of a lathe, indicated as S in light broken lines in both views.

This construction and arrangement, as stated in the beginning of this specification, gives accuracy of mounting and functioning, with rigidity and yet with sufficient yieldableness to compensate for any expansion or contraction on account of heat or cold.

A most important feature of this invention is the construction which makes possible the elimination of an outer, enlarged bearing mechanism, outside of the taper or case and which must necessarily function somewhat as a fly-wheel and thereby cause certain vibration or inaccuracy of operation.

Applicant's entire assembly is wholly within the taper or casing 5, and the roller elements 20 and 24 have their bearings on the inside of the case or taper 5 and on the surface of the center pin, and only the work end of the center pin projects beyond the end of the taper or case 5. This makes for compactness and rigidity and accuracy and also for neatness and uniformity.

I do not, however, limit my invention to the details of construction and arrangement here used to explain the invention, except as I may be limited by the hereto appended claims forming a part hereof.

I claim:

1. A center pin mechanism for lathes including a casing, a coiled spring therein with an absorbent pad compressible therewith, thrust bearing members at its opposite ends, a center pin in said casing having its inner end bearing against one of said thrust bearing members with anti-friction means therebetween, a series of roller bearings around said center pin, between said pin and the inner surface of said casing, with means for holding said rollers in operating positions around said center pin, and a removable retaining ring holding said center pin and said bearing rollers against longitudinal movement out of said casing.

2. A center pin mechanism including a case to be inserted into the stock of a lathe, said case being open at both ends and being uniformly tapered on its exterior surface substantially from end to end, a valve for closing the insert end of said case, a center pin inserted into the outer end thereof, a series of rollers interposed around said center pin within said case, a coiled spring in said case at the insert end thereof, a bearing element between said spring and said valve for closing said valve in the insert end of said case, a thrust bearing element interposed between the center pin and said spring, whereby pressure on the outer end of said center pin is resisted by the force of said coiled spring and whereby said valve is moved to close the insert end of said case.

3. A center pin mechanism to be inserted into the stock of a lathe and including: a case having a lubricating opening in its insert end with a ball valve for closing the same, a thrust element bearing on said ball valve, a spring operating in opposition thereto, a heavier coiled spring bearing against the opposite side of said thrust element, a ball bearing thrust mechanism bearing against the other end of said heavier coiled spring, a center pin inserted into the outer end of said case, a series of roller elements interposed around said center pin within said case with bearing rings at the opposite ends of said roller elements for holding them in operating positions.

4. In a center pin mechanism for lathes and the like, a case having a cylindrical chamber therein, a center pin inserted into the open outer end of said case, a series of roller elements around said pin within said case, with bearing rings for holding them in operating positions, a thrust element connected with the inner end of said pin and movable inwardly thereby, a coiled spring in said case, a ball bearing thrust mechanism between the end of said spring and said thrust element at the inner end of said pin, a thrust element at the other end of said spring, a valve interposed between said last mentioned thrust element and the inner open end of said case, and adapted to close said opening in the inner end of said case, when work load is put upon said center pin, whereby to prevent lubricant from working out of said case.

5. In a center pin mechanism, a case having a uniformly tapered exterior surface extending substantially from end to end and adapted to be received into the stock of a lathe, said case having two cylindrical chambers formed therein of different diameters, a center pin inserted into the outer end of said case, a series of roller bearings between said pin and the inside of said case, with bearing rings for holding said rollers in operating positions, a split holding ring around said center pin and operable to prevent the withdrawal of said center pin and said roller bearings from said case, a coiled spring in the insert end of said case, thrust bearing elements at its opposite ends, ball bearings interposed between the center pin and one of said thrust elements, and a ball valve interposed between the other thrust element and the inner end of said case, whereby work pressure on said center pin moves it inwardly against the force of said spring, and closes said ball valve in the inner end of said case.

6. In a center pin mechanism of the character referred to, in combination: a case, a center pin mounted therein to revolve and move endwise under load pressure, a thrust mechanism in said case against which said center pin bears and including a coiled spring, ball bearings between said pin and said spring, a thrust element and ball valve at the other end of said spring, and a lubricating pad in said coiled spring.

7. In a center pin mechanism, a case designed to be inserted bodily into the stock of a lathe and having a cylindrical chamber therein, with its innermost end open and provided with a valve seat, a center pin inserted into the outer end of said case with its work end projecting yieldingly out of the end thereof, a series of roller bearing members between the surface of said center pin and the inside wall of said case, with means holding them in operating positions, a coiled thrust spring in said case, at its inner end, thrust bearing means between the inner end of said center pin and said spring, and thrust means, including a ball valve, in the inner end of said case to be moved by said thrust spring to close the inner end of said case, said center pin being revoluble and movable axially within said case.

8. A live center for a lathe, comprising in combination: a case uniformly tapered on its outer surface substantially from end to end, a center pin projecting from one end of the case, radial bearing means in the case for rotatably supporting the center pin, thrust bearing means in the case adapted to absorb end load on the center pin, an opening in the other end of the case for the introduction of lubricant, a movable closure element for said opening, and a compression spring interposed between the thrust bearing means and said closure element.

KELVIN K. SHEPARD.

REFERENCES CITED

The following references are of record in the file of this patent:

UNITED STATES PATENTS

| Number | Name | Date |
| --- | --- | --- |
| 848,773 | Schulz | Apr. 2, 1907 |
| 979,034 | Rowe | Dec. 20, 1910 |
| 1,442,364 | Schnelle | Jan. 16, 1923 |
| 1,688,040 | Flinn | Oct. 16, 1928 |
| 1,700,837 | Fisher | Feb. 5, 1929 |
| 1,747,385 | Olsen | Feb. 18, 1930 |
| 1,919,004 | Bott | July 18, 1933 |
| 2,056,586 | Rohm | Oct. 6, 1936 |
| 2,140,565 | Svenson | Dec. 20, 1938 |
| 2,392,037 | Galloway | Jan. 1, 1946 |
| 2,464,359 | Vanderwall | Mar. 15, 1949 |

FOREIGN PATENTS

| Number | Country | Date |
| --- | --- | --- |
| 116,626 | Switzerland | May 26, 1926 |